US008845336B2

(12) United States Patent
Walsh et al.

(10) Patent No.: US 8,845,336 B2
(45) Date of Patent: Sep. 30, 2014

(54) LEARNING CONCEPT ORGANIZER

(76) Inventors: Stephen Joseph Walsh, Greensville, NC (US); Trisha Vanbrederode Kee, Ponte Vedra, FL (US)

(*) Notice: Subject to any disclaimer, the term of this patent is extended or adjusted under 35 U.S.C. 154(b) by 239 days.

(21) Appl. No.: 13/526,109

(22) Filed: Jun. 18, 2012

(65) Prior Publication Data

US 2013/0337428 A1    Dec. 19, 2013

(51) Int. Cl.
*G09B 3/00* (2006.01)
(52) U.S. Cl.
CPC ........................................ *G09B 3/00* (2013.01)
USPC ........................................................ 434/322
(58) Field of Classification Search
CPC ................................. G09B 3/00; G09B 3/02
USPC ................. 434/178, 322, 327, 346, 348, 363; 283/45, 46, 115, 117
See application file for complete search history.

(56) References Cited

U.S. PATENT DOCUMENTS

| | | | | |
|---|---|---|---|---|
| 1,656,030 A | * | 1/1928 | Waring | 434/207 |
| 2,824,389 A | * | 2/1958 | Orebaugh | 434/167 |
| 3,097,435 A | * | 7/1963 | Goldschmidt | 434/348 |
| 3,224,112 A | * | 12/1965 | Hanson | 273/270 |
| 3,744,154 A | * | 7/1973 | Pott | 434/167 |
| 4,259,788 A | * | 4/1981 | Wilson | 434/338 |
| 4,544,360 A | * | 10/1985 | Goodman | 434/178 |
| 5,403,014 A | * | 4/1995 | Anema et al. | 273/292 |
| 6,612,844 B1 | | 9/2003 | Vallee | |
| 6,767,215 B2 | | 7/2004 | Robertson | |
| 6,893,264 B2 | * | 5/2005 | Reed | 434/128 |
| 7,080,982 B2 | * | 7/2006 | Rawlins et al. | 434/156 |
| 8,459,999 B2 | * | 6/2013 | Washington | 434/174 |
| 2008/0085496 A1 | | 4/2008 | Hodge | |

* cited by examiner

*Primary Examiner* — Kurt Fernstrom
(74) *Attorney, Agent, or Firm* — Michael N. Cohen; Cohen IP Law Group P.C.

(57) ABSTRACT

The present invention is a learning organizer for assisting a learner. The learning organizer comprises a sheet having a front portion and a rear portion, the sheet folded substantially along a central line to form a first half and a second half, a plurality of flaps located on the first half, a plurality of holes provided along and proximate to the central line and punched through the first half and the second half, a plurality of lines on the rear portion and a plurality of fill-in-blanks pre-printed on the second half to write details of the learner. Each of the plurality of flaps includes a plurality of perforations and a plurality of scorings. The plurality of lines is provided for neat writing. The learning organizer allows the learner to write down learning information into each of the plurality of flaps so as to present, organize, learn and memorize learning concepts.

20 Claims, 5 Drawing Sheets

LEARNING CONCEPT ORGANIZER

CROSS-REFERENCE TO RELATED APPLICATIONS

Not Applicable.

STATEMENT REGARDING FEDERALLY SPONSORED RESEARCH AND DEVELOPMENT

Not Applicable.

FIELD OF THE DISCLOSURE

This disclosure relates to learning organizers, and more particularly to an improved learning organizer for assisting a learner to organize, present, learn and memorize learning concepts.

DISCUSSION OF RELATED ART

Learning tools such as flash cards, master charts, Venn diagrams, KWL charts etc. are widely used for educational purposes. Students usually create these learning tools themselves and insert the applicable information to the learning aids. These processes can be tedious and time consuming to the students. Teachers may also struggle to understand the organized information inserted by the students into the learning aids. Often, these types of learning aids are difficult to store and transport. Most of the flash cards and charts are cumbersome and can be easily lost. The main problem associated with the use of these learning tools is that the information cannot be easily organized. Currently, students have to physically create the learning aids by folding and cutting the paper and inserting the learning information in the learning aids.

U.S. Pat. Application. No. 20080085496 issued to Hodge on Apr. 10, 2008 discloses a learning tool for teaching a child how to read or to encourage a child to practice his or her reading skills. The learning tool includes a container having a plurality of compartments. A message strip is provided in each of the compartments. Each message strip contains a portion of a story or rhyme, so that when the messages are viewed in sequence, the child may read the story or rhyme from beginning to end. Each message strip is attached within the compartment at one end of the message strip. Each message strip is configured to be retrievable from the compartment, so that when the message strip is retrieved from the compartment the child can view the message contained on the strip. However, the child needs to pull the message strip out of the compartment and fold back the message strip into the compartment after use which can be a time consuming process.

U.S. Pat. No. 6,767,215 issued to Robertson on Jul. 27, 2004, describes an activity station and method of learning for reinforcing skills already taught by a teacher or institutional assistant. The activity station is comprised of a board having front and back folds, which when folded conceals the front of the board and when open reveals the front of the board and allows the board to stand erect. The board has removable labels, with a plurality of activity sets that provide practice in a subject; a plurality of skill sheets that provide testing in the subject; a plurality of management cards that track the student's progress; an activity zone having at least one activity set holder supported by the board for storing the activity sets; a skill sheet zone having a skill sheet holder supported by the board for storing the skill sheets; a work product zone having a work product holder supported by the board for storing incomplete and completed skill sheets; and an instruction zone having a management card holder supported by the board for storing the management cards. A student's progress is tracked, and the student's performance is evaluated by the results from the completed skill sheets. The activity station can then be closed to conceal the instructions and activities for ease in storage. However, the activity station is bulky and hence cannot be conveniently stored and carried by the user.

U.S. Pat. No. 6,612,844 issued to Vallee on Sep. 2, 2003, discloses an educational aid and method. The educational aid comprises a plurality of pages in a book, at least a first section, a second section, and a third section being simultaneously presented on a majority of pages in said book; a single sentence is presented in the first section presenting the subject matter; a second sentence is presented in the second section relaying the same subject matter; and a third sentence is presented in the third section presenting the same subject matter. The subject matter of each of said sections can be read and understood by a single user without assistance from one having a greater reading ability and/or a more advanced level of comprehension. However, the user cannot easily organize the information in this educational aid. Further, the educational aid does not have the capability to provide two or more pieces of information at a time.

Therefore, there is a need for a learning tool that provides an effective, easy-to-use learning concept organizer for students. Such a needed tool would be easily utilized to present, organize, study and memorize learning concepts by the student. The learning organizer is designed to fold in a strategic way to allow the student to flip between two or more pieces of information at a time. Such an organizer would include multiple, blank perforated flaps for the student to write learning information. Further, the organizer would be eco-friendly and provide a ready-to-use tool for students and teachers. Such a learning tool would provide a more effective way to study and a better organization of information than current learning tools. The present embodiment accomplishes these objectives.

SUMMARY OF THE DISCLOSURE

The present invention is a learning organizer for assisting a learner. The learning organizer comprises a sheet having a front portion and a rear portion, the sheet folded substantially along a central line to form a first half and a second half, a plurality of flaps located on the first half, a plurality of holes provided along and proximate to the central line and punched through the first half and the second half, a plurality of lines on the rear portion and a plurality of fill-in-blanks pre-printed on the second half. Each of the plurality of flaps includes a plurality of perforations and a plurality of scorings to provide ease to the learner. The plurality of lines is provided for neat writing and the plurality of fill-in-blanks is provided for writing details of the learner. The learning organizer allows the learner to write down learning information into each of the plurality of flaps so as to present, organize, learn and memorize learning concepts.

The learning organizer is constructed by strategically folding and cutting the sheet, with perforations, scoring, or lines as guides to the learner. The method of construction comprises the steps of folding the sheet substantially along the central line to form the first half and the second half. The first half may then be scored and perforated to form the plurality of flaps. The plurality of lines is then marked on the rear portion of the sheet. The plurality of holes is punched along and proximate to the central line. The plurality of fill-in-blanks is pre-printed on the rear portion for writing the details of the learner. The learning organizer allows the learner to flip between each of the plurality of flaps to view two or more pieces of the learning information at a time.

Each of the plurality of flaps is capable of providing a single piece of learning information to the learner at a time. This allows the learner to break down the learning information, write and organize the learning into each of the plurality of flaps, thereby allowing access to parts of the learning information at a time. The learner uses the learning organizer to insert the learning information, as needed to master a particular learning concept. The learning organizer may provide an efficient learning tool to the learners from elementary school through college who are memorizing facts or correlating definitions with vocabulary terms.

The present invention provides an improved learning organizer for assisting the learner to present, organize, learn and memorize learning concepts. Such an organizer can be utilized for organizing learning information of various subjects in a specific order. Further, the organizer is portable and provides a ready-to-use learning tool for learners and teachers. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Figure 1:
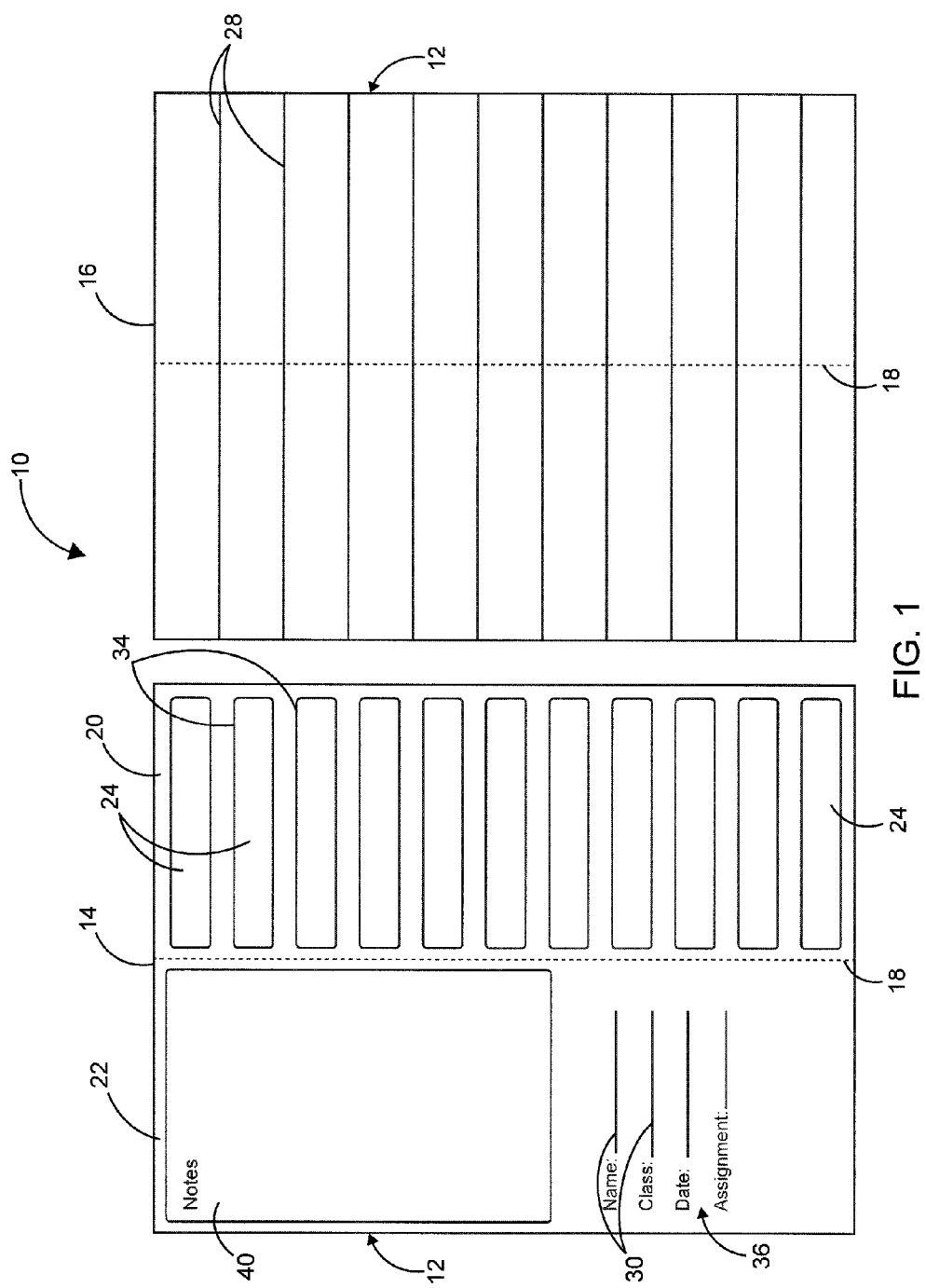
FIG. 1 is a perspective view of a front portion and a rear portion of a learning organizer in accordance with a preferred embodiment of the present invention.

FIG. 1 is a perspective view of a front portion 14 and a rear portion 16 of a learning organizer 10 for assisting a learner in accordance with a preferred embodiment of the present invention. The learning organizer 10 comprises a sheet 12 having the front portion 14 and the rear portion 16, the sheet 12 folded substantially along a central line 18 to form a first half 20 and a second half 22, a plurality of flaps 24 located on the first half 20, a plurality of holes (not shown) provided along and proximate to the central line 18 and punched through the first half 20 and the second half 22, a plurality of lines 28 on the rear portion 16 and a plurality of fill-in-blanks 30 pre-printed on the second half. Each of the plurality of flaps 24 includes a plurality of perforations (not shown) and a plurality of scorings 34 to provide ease to the learner (not shown). The plurality of lines 28 is provided for neat writing and the plurality of fill-in-blanks 30 is provided for writing details of the learner (not shown). The learning organizer 10 allows the learner to write down learning information into each of the plurality of flaps 24 so as to present, organize, learn and memorize learning concepts.

The learning organizer 10 is constructed by strategically folding and cutting the sheet 12, with perforations, scoring, or lines as guides to the learner. The method of construction comprises the steps of folding the sheet 12 substantially along the central line 18 to form the first half 20 and the second half 22. The first half 20 may then be scored and perforated to form the plurality of flaps 24. The plurality of lines 28 are then marked on the rear portion 16 of the sheet 10. The plurality of holes (not shown) is punched along and proximate to the central line 18. The plurality of fill-in-blanks 30 may be pre-printed on the rear portion 16 for writing the details of the learner 36. The details of the learner 36 may be selected from a group consisting of: name, class, date and assignment. The plurality of fill-in-blanks 30 may be pre-printed with soy ink. The second half 22 of the learning organizer 10 includes an area 40 for the learner to insert learning notes. The learning organizer 10 is portable and provides a ready-to-use learning tool for teachers and learners.

Figure 2:
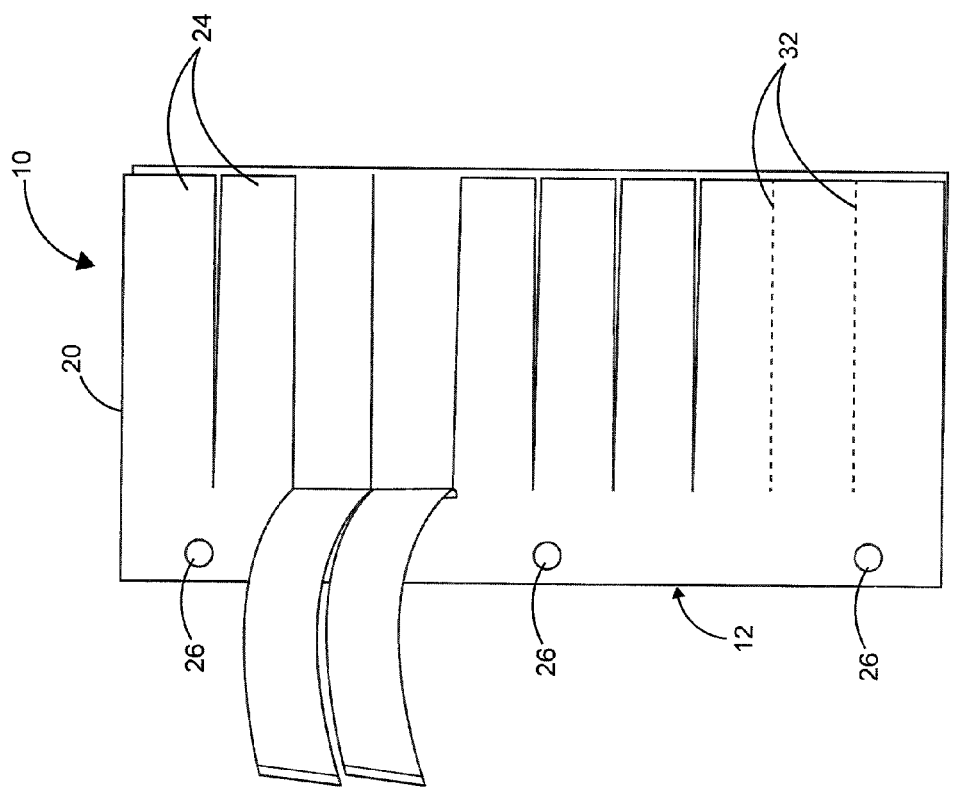
FIG. 2 is a perspective view of the learning organizer in accordance with the preferred embodiment of the present invention.

FIG. 2 is a perspective view of the learning organizer 10 in accordance with a preferred embodiment of the present invention. Each of the plurality of flaps 24 is capable of providing a single piece of learning information to the learner (not shown) at a time. This allows the learner to break down the learning information, write and organize the learning into each of the plurality of flaps 24, thereby allowing access to parts of the information at a time. This type of learning system allows for a more effective way of learning and a better organization of information. The plurality of flaps 24 may vary in number in accordance with the flexibility of the learner. The plurality of flaps 24 may vary from 3 to 11 in number, intended to provide additional space for drawings or information based on the needs of the learner. Each of the plurality of flaps 24 is blank to allow the learner to write the learning information. Each of the plurality of flaps 24 includes a plurality of perforations 32 to provide ease to the learner. The learning organizer 10 may be utilized for organizing learning information of various subjects selected from a group consisting of: mathematics, vocabulary, history, geography, science and spelling.

Figure 3:
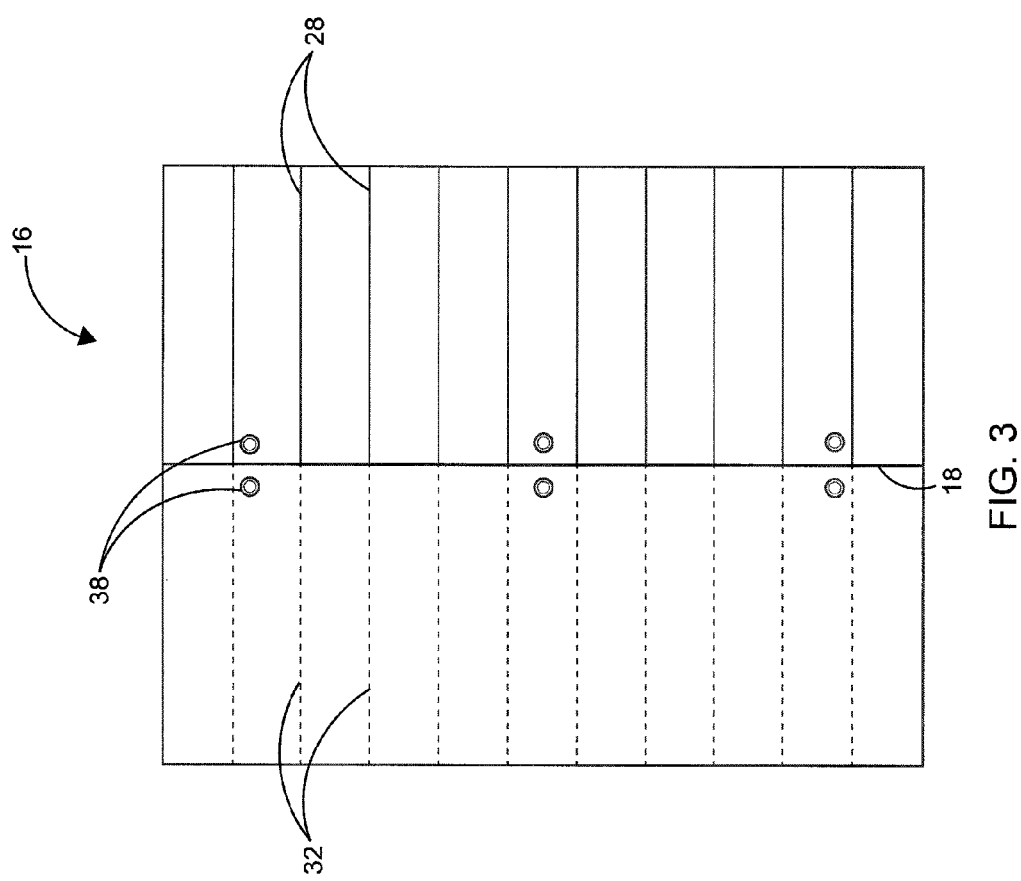
FIG. 3 is a perspective view of the rear portion of the learning organizer, illustrating a plurality of perforations and a plurality of holes.

Referring to FIG. 3, a perspective view of the rear portion 16 of the learning organizer 10 is illustrated. The rear portion 16 may include a plurality of die cuts 38 for the plurality of holes 26. The plurality of holes 26 may allow for easy archiving and hence provides a perfect subject-by-subject study guide to the learner. Die cuts may also be provided for the plurality of perforations 32. The plurality of lines 28 is provided for neat writing and therefore, easily helps to organize the learning information. Due to the compact size and the plurality of holes 26, the learning organizer 10 can easily fit in the typical school binders and backpacks. The learner uses the learning organizer 10 to insert the learning information, as needed to master a particular learning concept. The learning organizer 10 may provide an efficient learning tool to the learners from elementary school through college who are memorizing facts or correlating definitions with vocabulary terms.

Figure 4:
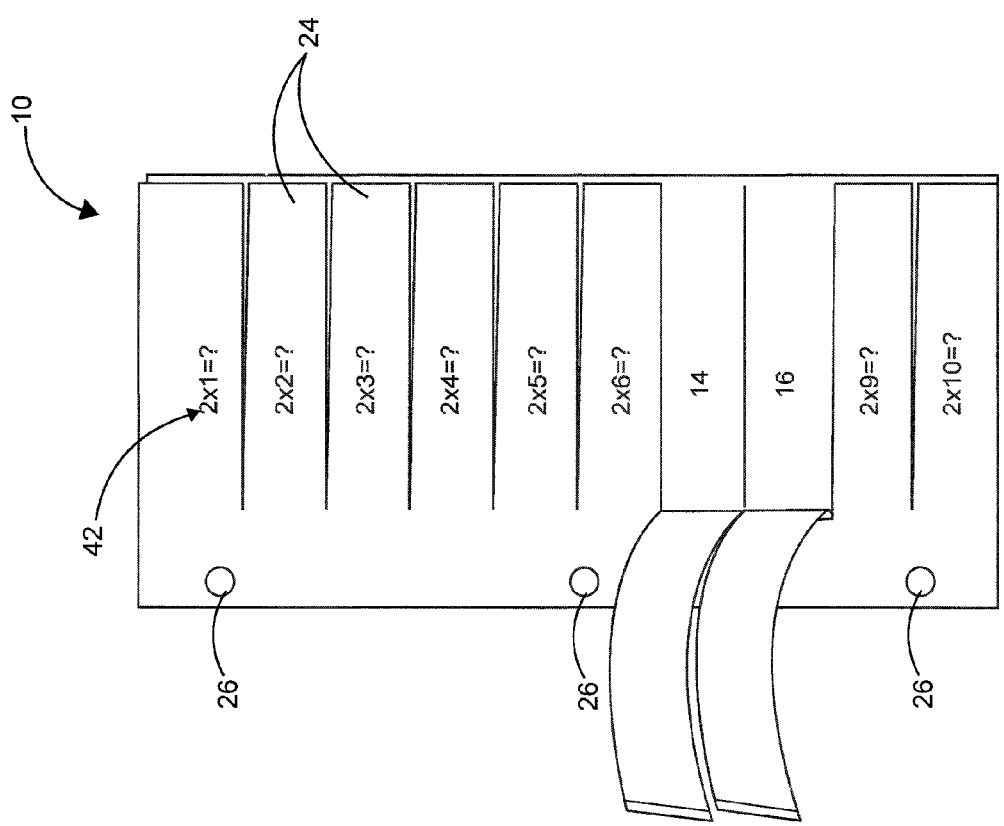
FIG. 4 illustrates the learning organizer with hand written learning information.

FIG. 4 illustrates the learning organizer 10 with hand written learning information 42. The learning organizer 10 shows a multiplication table of number 2 written in the plurality of flaps 24. Organizing the learning concepts in this way may help to increase the comprehension and the retention of the learners. The learning organizer 10 may be folded in a strategic way to allow the learner to flip between each of the plurality of flaps 24 to view two or more pieces of the learning information at a time. The learning organizer 10 may be utilized for organizing learning information of various subjects in a specific order. The learning organizer 10 is made of an eco-friendly material. The eco-friendly material may be a recyclable post-consumer fiber paper which is 100% recyclable and landfill safe. The learning organizer 10 may be available in multiple colors, weight, textures, and with cut out shapes. The learning organizer 10 may be available in twelve or thirty solid packs. The learning organizer 10 may also be available in a ready to hang packaging with color or rainbow packs. The learning organizer 10 of different colors may be used for each subject to assure easy identification and prevent intermingling. By employing the learning organizer 10, learning may be made easier and more fun, thus more fulfilling for both the learner and the teacher. The learning organizer 10 may be sold individually, in groups or in a binder/notebook. In an alternate embodiment, a custom binder may also be available with the learning organizer 10.

Figure 5C:
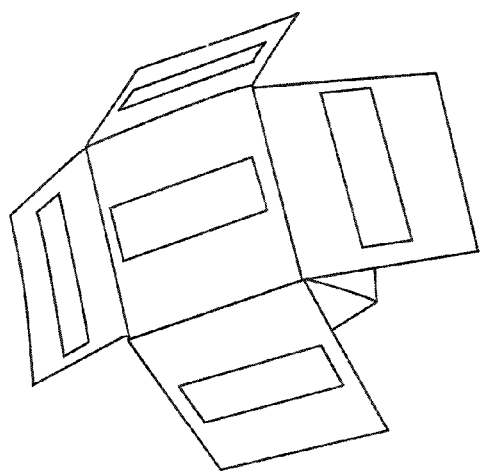
FIGS. 5A-5C illustrate alternate embodiments of the learning organizer.
Figure 5B:
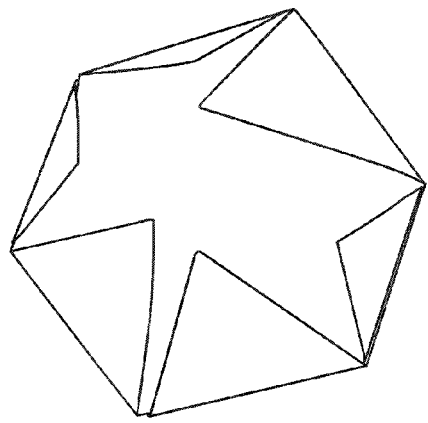
Figure 5A:
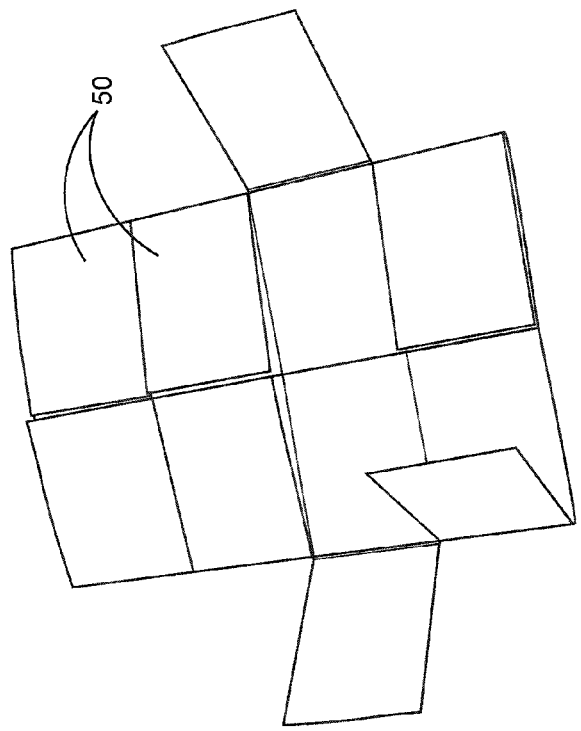

FIGS. 5A-5C illustrate alternate embodiments of the learning organizer 10. FIG. 5A illustrates a learning organizer with a plurality of flaps 50. FIGS. 5B-5C illustrate learning organizers constructed in different shapes and sizes in accordance with the learner's need. Each of these embodiments is intended to give additional space for drawings or information based on the needs of the learner. Each organizer style is consistent in methodology, but may vary in the color, texture and weight of the sheet, the plurality of flaps, the plurality of perforations and the plurality of scorings that provide flexibility to the learners.

While a particular form of the invention has been illustrated and described, it will be apparent that various modifications can be made without departing from the spirit and scope of the invention. For example, the learning organizer 10 may be available without the plurality of lines 28 so as to provide additional space for drawings or learning information. In addition, the first half 20 and the second half 22 may further be folded substantially along the central line thereof providing more flexibility in learning. Accordingly, it is not intended that the invention be limited, except as by the appended claims.

What is claimed is:

1. A learning organizer, comprising:
    a sheet folded substantially along a central line to form a first half and a second half, the sheet includes a front portion and a rear portion;
    a plurality of flaps located on the first half;
    a plurality of holes located along and proximate to the central line;
    a plurality of lines on the rear portion; and
    a plurality of fill-in-blanks pre-printed on the second half;
    whereby the learning organizer provides assistance to a learner to break down learning information into each of the plurality of flaps.

2. The learning organizer of claim 1 allows the learner to present, organize, learn and memorize learning concepts.

3. The learning organizer of claim 1 wherein the plurality of lines are provided for neat writing.

4. The learning organizer of claim 1 wherein the plurality of fill-in-blanks is provided for writing details of the learner.

5. The learning organizer of claim 1 wherein the learning organizer is utilized for organizing learning information of various subjects selected from a group consisting of: mathematics, vocabulary, history, geography, science and spelling.

6. A learning organizer for assisting a learner, the learning organizer comprising:
    a sheet having a front portion and a rear portion, the sheet being folded substantially along a central line to form a first half and a second half;
    a plurality of flaps located on the first half, each of the plurality of flaps includes a plurality of perforations and scoring to provide ease to the learner;
    a plurality of holes provided along and proximate to the central line, each of the plurality of holes being punched through the first half and the second half;
    a plurality of lines on the rear portion, the plurality of lines being provided for neat writing; and
    a plurality of fill-in-blanks pre-printed on the second half, the plurality of fill-in-blanks being provided for writing details of the learner;
    whereby the learning organizer allows the learner to write down learning information into each of the plurality of flaps so as to present, organize, learn and memorize learning concepts.

7. The learning organizer of claim 6 wherein the learning organizer allows the learner to break down the learning information into each of the plurality of flaps.

8. The learning organizer of claim 6 wherein each of the plurality of flaps is capable of providing a single piece of learning information at a time.

9. The learning organizer of claim 6 wherein the plurality of flaps varies in number in accordance with the flexibility of the learner.

10. The learning organizer of claim 6 wherein the details of the learner is selected from a group consisting of: name, class, date and assignment.

11. The learning organizer of claim 6 wherein the plurality of holes allow for easy archival.

12. The learning organizer of claim 6 wherein the learning organizer is utilized for organizing learning information of various subjects selected from a group consisting of: mathematics, vocabulary, history, geography, science and spelling.

13. The learning organizer of claim 6 wherein the learning organizer is made of an eco-friendly material.

14. The learning organizer of claim 13 wherein the eco-friendly materials are recyclable post-consumer fiber paper.

15. The learning organizer of claim 6 wherein the learning organizer is portable.

16. A method for constructing a learning organizer to assist a learner, the method comprising the steps of:
    a) providing a sheet having a front portion, a rear portion and a central line;
    b) folding the sheet substantially along the central line to form a first half and a second half;
    c) scoring and perforating the first half to form a plurality of flaps;
    d) marking a plurality of lines on the rear portion of the sheet; and
    e) punching along and proximate to the central line to form a plurality of holes.

17. The method of claim 16 wherein the learning organizer allows the learner to write down learning information into each of the plurality of flaps so as to present, organize, learn and memorize learning concepts.

18. The method of claim 16 wherein the plurality of holes allow for easy archival.

19. The method of claim 16 wherein the plurality of lines are provided for neat writing.

20. The method of claim 16 wherein the second half includes a plurality of fill-in-blanks for writing details of the learner.

* * * * *

UNITED STATES PATENT AND TRADEMARK OFFICE
CERTIFICATE OF CORRECTION

PATENT NO. : 8,845,336 B2  
APPLICATION NO. : 13/526109  
DATED : September 30, 2014  
INVENTOR(S) : Trisha Vanbrederode Kee et al.

Page 1 of 1

It is certified that error appears in the above-identified patent and that said Letters Patent is hereby corrected as shown below:

On the title page item (76) should read

Trisha Vanbrederode Kee, Ponte Vedra, FL (US);  
Stephen Joseph Walsh, Greensville, NC (US)

Signed and Sealed this  
Thirtieth Day of December, 2014

Michelle K. Lee  
*Deputy Director of the United States Patent and Trademark Office*